(12) United States Patent
Hamilton

(10) Patent No.: US 6,789,462 B1
(45) Date of Patent: Sep. 14, 2004

(54) BARBECUE AND SMOKER APPARATUS

(76) Inventor: Mark Hamilton, 9719 Durham Dr., St. Louis, MO (US) 63137

( * ) Notice: Subject to any disclaimer, the term of this patent is extended or adjusted under 35 U.S.C. 154(b) by 0 days.

(21) Appl. No.: 10/603,312

(22) Filed: Jun. 24, 2003

Related U.S. Application Data

(60) Provisional application No. 60/391,392, filed on Jun. 25, 2002.

(51) Int. Cl.[7] .............................. A23L 1/00; A23L 1/01; A47J 37/00; A47J 37/04; A47J 37/07
(52) U.S. Cl. .............................. 99/340; 99/448; 99/450; 99/467; 99/482; 126/59.5; 126/25 R
(58) Field of Search .................. 99/339, 340, 444–446, 99/448, 450, 449, 400, 401, 481, 482, 516, 534, 467–476; 126/25 R, 9 R, 21 A, 79, 41 R, 59.5; 131/329, 330, 185, 200; 110/102, 108, 118, 196; 426/523, 314, 315

(56) References Cited

U.S. PATENT DOCUMENTS

| | | | | |
|---|---|---|---|---|
| 4,467,709 A | * | 8/1984 | Anstedt | 99/482 |
| 4,704,957 A | * | 11/1987 | Kerres | 99/451 |
| 4,823,684 A | * | 4/1989 | Traeger et al. | 99/447 |
| 4,934,260 A | * | 6/1990 | Blevins | 99/482 |
| 4,957,039 A | * | 9/1990 | Reyes | 99/340 |
| 5,168,796 A | * | 12/1992 | Porton et al. | 99/340 |
| 5,910,209 A | * | 6/1999 | Lee | 99/450 |
| 5,913,967 A | * | 6/1999 | Eisele | 99/468 |
| 5,967,027 A | * | 10/1999 | Higashimoto | 99/472 |
| 6,012,381 A | * | 1/2000 | Hawn | 99/340 |
| 6,038,964 A | * | 3/2000 | Sikes | 99/340 |
| 6,199,474 B1 | * | 3/2001 | Lee | 99/450 |

* cited by examiner

Primary Examiner—Timothy F. Simone
(74) Attorney, Agent, or Firm—Polster, Lieder, Woodruff & Lucchesi

(57) ABSTRACT

A high volume multi-chamber barbecue and smoker apparatus is provided, including multiple smoker chambers and multiple heating chambers interconnected by a ventilation and exhaust system of pipes with manually operated valves for controlling air and smoke flow between multiple chambers as well as to the outside environment. The ventilation and exhaust system permits ventilation and drafting to the apparatus to be controlled so that a charcoal or wood fire can be more quickly and efficiently started, and then air ventilation and smoke selectively adjusted during cooking to control the amount of heat or smoke delivered to the food in various smoker and heating chambers of the multi-chamber apparatus.

5 Claims, 4 Drawing Sheets

BARBECUE AND SMOKER APPARATUS

REFERENCE TO RELATED APPLICATIONS

The present application claims priority of U.S. Provisional Patent Application Serial No. 60/391,392 filed Jun. 25, 2002, the contents of which are expressly incorporated herein by reference.

FIELD OF THE INVENTION

The present invention relates in general to outdoor cooking devices and, more particularly, to a combination barbecue and smoker apparatus.

BACKGROUND OF THE INVENTION

Outdoor barbecue grills and smokers are currently very popular, including charcoal and gas grills and barbecues for home use, as well as larger gas grills, barbecue pits and fire pits for commercial use. Commercial barbecues that use charcoal or wood fires typically use a pit constructed of sheet metal or grating, often simply a half of a large metal storage drum longitudinally cut and positioned on supports with a metal grating retained in the drum to provide a large cooking surface. Typically, for large events at which meat is cooked for many people, many of these large drums are set up and simply used simultaneously side by side to cook a high volume of meat. However, the use of multiple drums is relatively labor intensive, inconvenient and inefficient in that the drums are bulky and messy to transport, inconvenient to set up, and result in a relatively low ratio of cooking surface to heat source. In addition, although an individual drum can be used as a smoker, it is not typically easily set up as a combined smoker and barbecue.

Against this background, and considering the increasing popular demand for outdoor barbecuing and smoking, a need exists for a high volume barbecue apparatus that also can be used simultaneously as smoker apparatus. A need also exists for apparatus in multiple levels of heating can be simultaneously maintained to better serve a multitude of diners who may be eating at different times.

SUMMARY OF THE INVENTION

A high volume multi-chamber barbecue and smoker apparatus is provided, including multiple smoker chambers and multiple heating chambers interconnected by a ventilation and exhaust system of pipes with manually operated valves for controlling air and smoke flow between multiple chambers as well as to the outside environment. The ventilation and exhaust system permits ventilation and drafting to the apparatus to be controlled so that a charcoal or wood fire can be more quickly and efficiently started, and then air ventilation and smoke selectively adjusted during cooking to control the amount of heat or smoke delivered to the food in various smoker and heating chambers of the multi-chamber apparatus.

DESCRIPTION OF THE PREFERRED EMBODIMENT

While the invention is susceptible of embodiment in many different forms, there is described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the claims.

Figure 1:
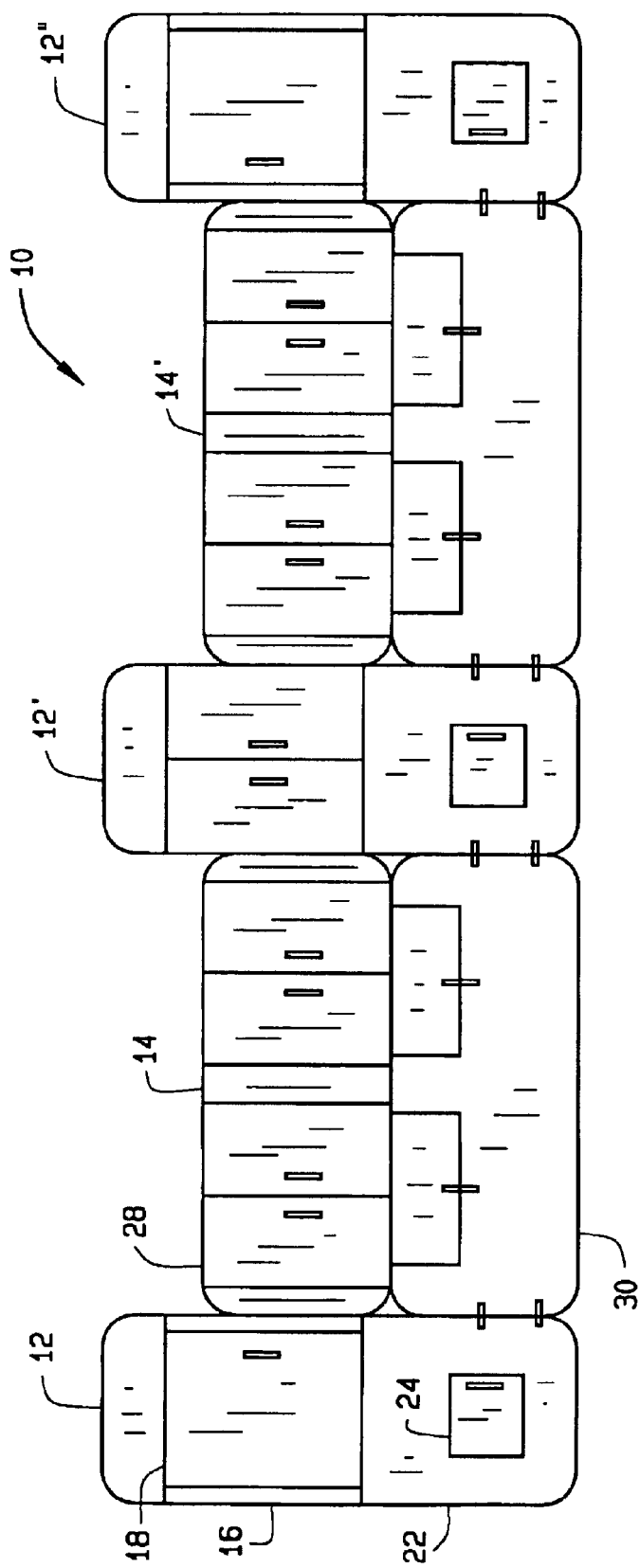
FIG. 1 is a schematic illustration of a front view of a barbecue and smoker apparatus in accordance with an exemplary embodiment.
Figure 2:
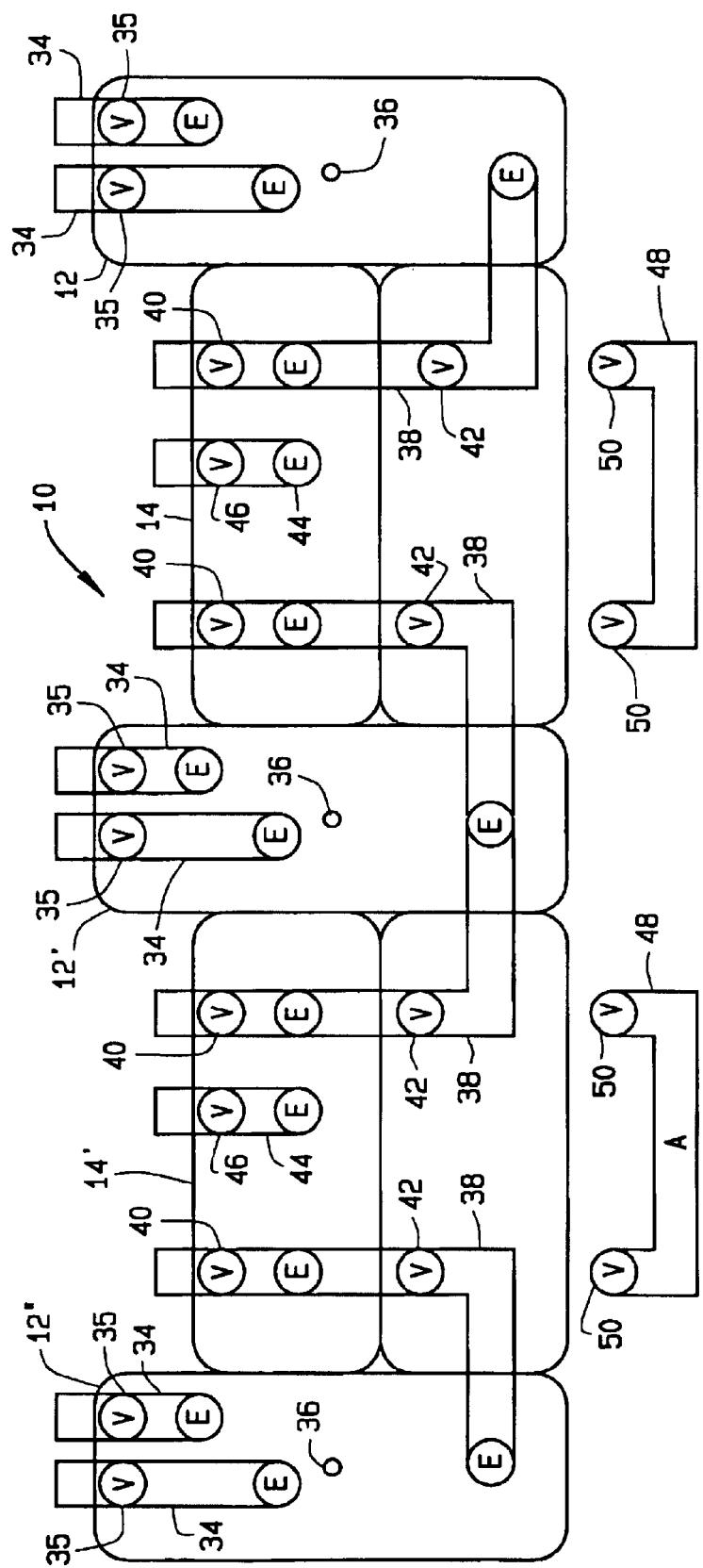
FIG. 2 is a schematic illustration of a rear view of the barbecue and smoker apparatus in accordance with the exemplary embodiment shown in FIG. 1.
Figure 3:
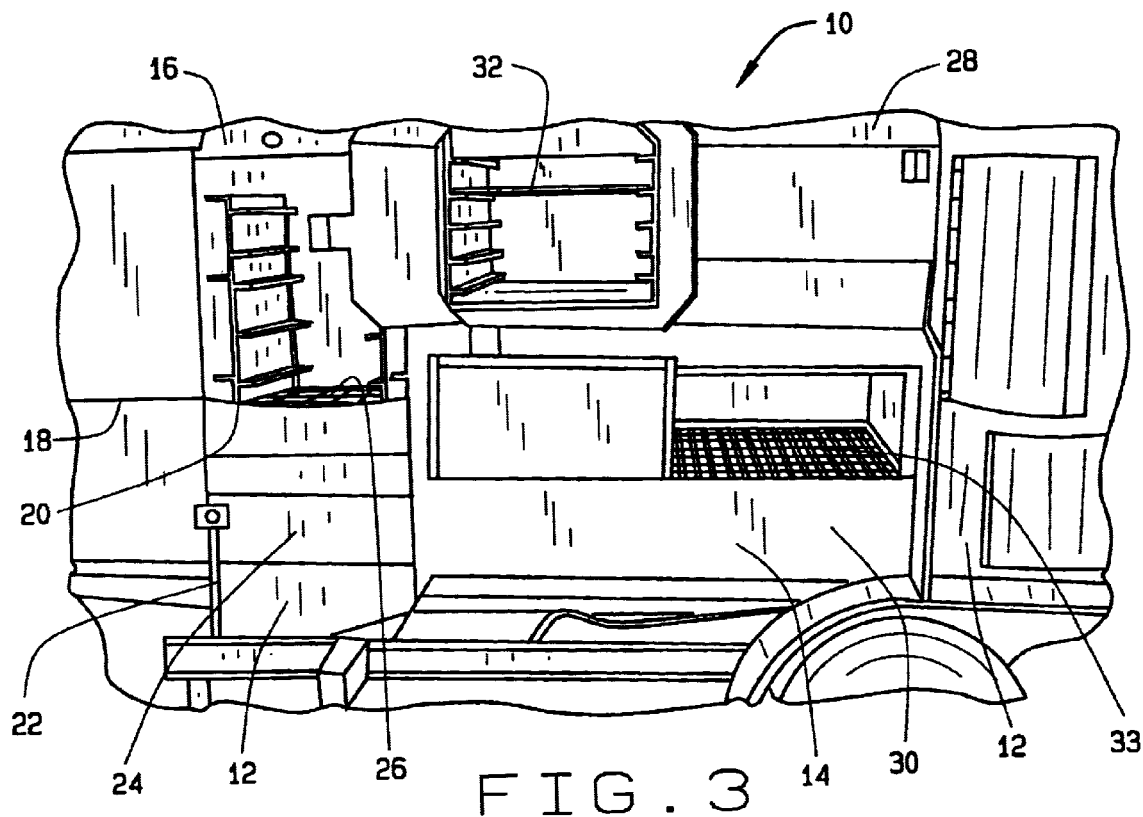
FIG. 3 is a front perspective view of the barbecue and smoker apparatus.

Referring now to FIGS. 1–3, there is shown a barbecue and smoker apparatus 10. The barbecue and smoker apparatus 10 generally comprises a plurality of smoking chambers 12 and cooking chambers 14 formed from sheet metal or sheet steel. In the exemplary embodiment shown, the apparatus 10 includes five chambers 12, 14. The smoking chambers 12 each comprise an upper portion 16 having a door 18 mounted thereon and racks 20 mounted therein. The racks 20 can support trays of food to be cooked within the smoking chamber 12. The lower portion 22 of the smoking chamber 12 comprises a firebox for burning wood to create the smoke for the smoking chamber 12 and comprises a door 24 for stocking the lower portion 20 with wood. The upper portion 16 and lower portion 22 are separated by a grate 26.

Figure 4:
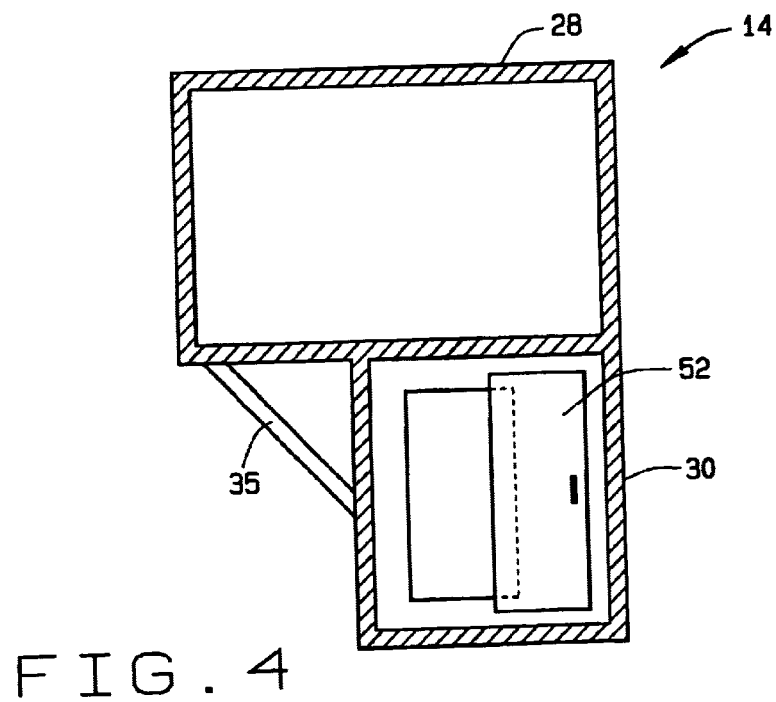
FIG. 4 is a close-up front perspective view of the barbecue and smoker apparatus showing an interior of a smoker chamber.

Located between the smoking chamber 12 and the smoking chamber 12', and also between the smoking chamber 12' and the smoking chamber 12", are the cooking chambers 14, 14' comprising an upper portion 28 and a lower portion 30 comprising welded sheets of steel. The upper portion 28 comprises racks 32 for holding trays of meat to be cooked and the lower portion 30 includes a firebox for burning fuel, such as wood or charcoal. Doors 29 are provided to enable access to the interior of the upper portion and doors 31 are provided to gain access to the lower portion. A grate 33 is included in the lower portion 30 cooking food near the fire and the grate 33 is adjustable to varying heights within the lower portion 30. Furthermore, as shown in FIG. 4, the top portion 28 extends rearwardly farther than the bottom portion 30, such that if the temperature in the cooking chamber 14 should increase beyond that which is acceptable, the tray of meat on the rack 32 can be pushed rearwardly in the cooking chamber 14 such that the meat will not be located directly over the fire. A support bracket 35 is provided to support the upper portion 28 upon the lower portion 30. Furthermore, a slidable door 52 is located in the interior of the lower portion 30 of each cooking chamber. The slidable door 52 covers openings through the ends of the lower portion 30 of the cooking chambers 14 and adjacent openings through the lower portion 22 of the smoker chambers 12 that connect the interiors of each lower portion 30 cooking chamber 14 with the interior of the lower portion 22 of the smoking chamber 12. When a user desires to use the smoking chambers 14, the sliding doors 52 are manually retracted so that smoke flows into the smoking chambers 12.

Referring to FIG. 2, a ventilation system for the present invention is disclosed. Each smoking chamber has a pair of exhaust pipes 34 attached to the upper portion 16 at an exhaust point E. Each exhaust pipe 34 has a valve 35 associated therewith so that the temperature and ventilation of the smoking chambers 12 can be monitored and controlled. Thermometers 36 are also provided in each smoking chamber 12 for this purpose. Moreover adjacent smoking chambers 12 and cooking chambers 14 are connected via ventilation pipes 38 at ventilation points E such that heat can be shared between the adjacent chambers. Furthermore, the ventilation pipes 38 provide for exhausting of heated air through valves 40. The ventilation between adjacent compartments can be controlled by valves 42. Finally, exhaust pipes 44 attach to the cooking chamber 14 at exhaust points E and can be controlled by valves 46. Thus, manual adjustment of valves is used to control the heat and smoke flow, and thus controls the speed of cooking and smoking of the food.

In addition, an air supply pipe 48 is coupled to the lower portion 30 of each cooking chamber 14 and includes a manually operated valve 50 for controlling air flow into each lower portion 30. When the air supply pipe valve 50 is in the full open position, maximum air flow into a first tier drum that houses a fire aids ignition and heating of the fire in the drum. After the fire is ignited or after the fire is suitably hot, the position of the manual control valve in the supply pipe 48 can be adjusted to down-regulate air flow into the lower portion 30 that houses the fire, and thus aid in regulating the heat of the fire and speed of cooking throughout the apparatus.

Figure 5:
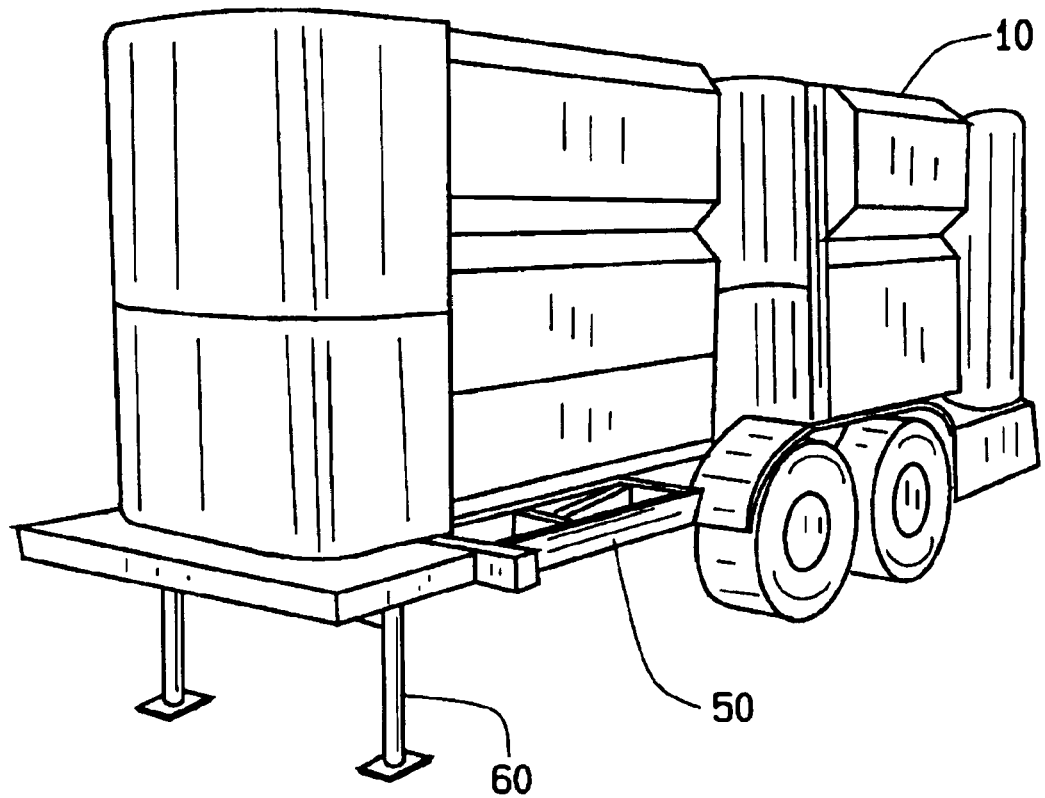
FIG. 5 is a close-up front view of the barbecue and smoker apparatus showing interiors of a smoker chamber, a first level heating chamber and a second level heating chamber.

FIG. 5 shows the present inventive apparatus 10 provided on a trailer 50. While the entire apparatus 10 is shown positioned on a trailer for convenient transportability, it can also be supported on any suitably sturdy structure. Furthermore, the trailer 50 is provided with jack 60 at all four corners so that the trailer 50 may be leveled when parked upon uneven ground. Finally, when the apparatus is used upon a trailer or other wise suspended above the ground, ash doors may be provided in the bottom of the smoking chamber 14 and the cooking chamber 12 to aid in ash removal.

The high-volume, multi-chamber barbecue and smoker apparatus is used to provide and control multiple heating levels of heating and smoking in a single apparatus. Starting and heating of the cooking fire, as well as control of heating and smoking levels within each chamber, are conveniently controlled through the valve-regulated system of ventilation, exhaust and air supply pipes and valves that interconnect the multiple chambers as well as provide exhaust to, and air supply from the outside. While the exemplary embodiment includes five chambers—three upright smoker chambers and two horizontally oriented cooking chambers—the invention also contemplates an alternative embodiment including two smoker chambers and one horizontally oriented cooking chamber. Optionally, a retractable roof may be provided over the cooker apparatus to protect personnel operating the apparatus from sun and rain.

While the specific embodiments have been described, numerous modifications come to mind without significantly departing from the spirit of the invention, and the scope of protection should only limited by the scope of the accompanying claims.

I claim:

1. A combination smoker and barbeque grill comprising:
   a cooking chamber having an upper portion and a lower portion, the upper portion comprising racks for placing food to be cooked, the lower portion comprising a firebox for burning fuel and a grate for cooking food;
   a smoking chamber having an upper portion for placing food to be smoked and a lower portion comprising a firebox for burning fuel;
   wherein the lower portion of the cooking chamber and the lower portion of the smoking chamber are attached and communicate via an opening that is selectably covered and uncovered by a door; and
   wherein the lower portion of the smoking chamber is selectively connected to the upper portion of the cooking chamber by a ventilation pipe having a valve therein.

2. The combination smoker and barbeque grill of claim 1 further comprising:
   an exhaust pipe attached to the upper portion of the cooking chamber further comprising a valve for selectively exhausting air from the upper portion of the cooking chamber.

3. The combination smoker and barbeque grill of claim 2 further comprising:
   an exhaust pipe attached to the upper portion of the smoking chamber further comprising a valve for selectively exhausting air from the upper portion of the smoking chamber.

4. The combination smoker and barbeque grill of claim 3 further comprising:
   a second exhaust pipe attached to the upper portion of the smoking chamber further comprising a valve for selectively exhausting air from the upper portion of the smoking chamber.

5. The combination smoker and barbeque grill of claim 4 further comprising:
   an exhaust pipe attached to the upper portion of the cooking chamber further comprising a valve for selectively exhausting air from the upper portion of the cooking chamber.

* * * * *